(12) United States Patent
Tanne

(10) Patent No.: US 8,094,885 B2
(45) Date of Patent: Jan. 10, 2012

(54) SYSTEM AND METHOD FOR TRACKING AN ELECTRONIC DEVICE

(75) Inventor: Yaron Tanne, Tel Aviv (IL)

(73) Assignee: Y.T. Ventures Ltd, Tel Aviv (IL)

( * ) Notice: Subject to any disclaimer, the term of this patent is extended or adjusted under 35 U.S.C. 154(b) by 299 days.

(21) Appl. No.: 12/531,181

(22) PCT Filed: Mar. 26, 2008

(86) PCT No.: PCT/IL2008/000414
§ 371 (c)(1),
(2), (4) Date: Sep. 14, 2009

(87) PCT Pub. No.: WO2008/120189
PCT Pub. Date: Oct. 9, 2008

(65) Prior Publication Data
US 2010/0067743 A1  Mar. 18, 2010

(51) Int. Cl.
*G06K 9/00* (2006.01)
(52) U.S. Cl. .................. 382/103; 382/165
(58) Field of Classification Search .......... 382/103, 382/162, 165, 274
See application file for complete search history.

(56) References Cited

U.S. PATENT DOCUMENTS

| | | | |
|---|---|---|---|
| 6,088,469 A * | 7/2000 | Fukumura et al. | 382/103 |
| 6,363,160 B1 | 3/2002 | Bradski et al. | |
| 6,538,645 B1 | 3/2003 | Juang et al. | |
| 6,760,465 B2 | 7/2004 | Mcveigh et al. | |
| 7,113,193 B2 | 9/2006 | Marks | |
| 2002/0141615 A1 | 10/2002 | Mcveigh et al. | |
| 2004/0041786 A1 | 3/2004 | Inoue et al. | |
| 2005/0024379 A1 | 2/2005 | Marks | |

FOREIGN PATENT DOCUMENTS

| | | |
|---|---|---|
| JP | 07244557 | 9/1995 |
| WO | WO 03/079179 A | 9/2003 |

OTHER PUBLICATIONS

International Search Report mailed Jul. 23, 2008 for PCT/IL2008/000414.
Written Opinion of the International Searching Authority mailed Jul. 23, 2008 for PCT/IL2008/000414.
European Examination Report dated Jan. 13, 2010 issued for European application No. 08720039.0.
Extended European Search Report issued for European Application No. 10187311.5 on Apr. 1, 2011.
Office Action issued for Japanese Application No. 2010-500433 on May 24, 2011.

* cited by examiner

*Primary Examiner* — Phuoc Tran
(74) *Attorney, Agent, or Firm* — The Law Office of Michael E. Kondoudis

(57) ABSTRACT

A system for tracking a spatially manipulated user controlling object using a camera associated with a processor. While the user spatially manipulates the controlling object, an image of the controlling object is picked-up via a video camera, and the camera image is analyzed to isolate the part of the image pertaining to the controlling object for mapping the position and orientation of the device in a two-dimensional space. Robust data processing systems and computerized method employing calibration and tracking algorithms such that minimal user intervention is required for achieving and maintaining successful tracking of the controlling object in changing backgrounds and lighting conditions.

11 Claims, 3 Drawing Sheets

SYSTEM AND METHOD FOR TRACKING AN ELECTRONIC DEVICE

CROSS REFERENCE TO RELATED APPLICATION

This application is a national phase of international application No. PCT/IL2008/000414, filed Mar. 26, 2008, which in turn claimed the benefit of U.S. Provisional Patent Application 60/907,353, filed Mar. 27, 2007, all of which are incorporated herein by reference in their entirety.

TECHNICAL FIELD

The present invention generally relates to computer spatial input systems, and more specifically to computer vision systems with tracking capabilities directed at the input module of such systems.

BACKGROUND OF THE INVENTION

Many computerized systems designed for spatial user interactivity require the tracking of the user activity. Specifically, systems based on cameras, for tracking objects that are manipulated by user are known in the art. These tracking systems in conjunction with the user manipulated objects serve as computer input devices.

U.S. Pat. No. 6,363,160 which is incorporated herein by reference in its entirety discloses a method of interfacing with an electronic system. The method includes receiving images from a camera. Then, a portion of at least one image from the camera is tracked. A pattern in the tracked portion of the image is recognized. Thus, the electronic system is controlled based on the recognized pattern.

U.S. Pat. No. 6,760,465 which is incorporated herein by reference in its entirety discloses a automated object tracking system for tracking a colored object through a series of frames of data. The system has a first image source device to provide a data array of pixels of a digital image. A second image source device provides a binary image of the data array. The system utilizes an analysis system to create a first histogram for rows of the binary image. Each histogram is thresholded, and is utilized thereafter to estimate the center of a tracked object in the binary image.

U.S. Pat. No. 7,113,193 which is incorporated herein by reference in its entirety discloses a hand-manipulated prop is picked-up via a single video camera, and the camera image is analyzed to isolate the part of the image pertaining to the object for mapping the position and orientation of the object into a three-dimensional space, wherein the three-dimensional description of the object is stored in memory and used for controlling action in a game program, such as rendering of a corresponding virtual object in a scene of a video display. Algorithms for deriving the three-dimensional descriptions for various props employ geometry processing, including area statistics, edge detection and/or color transition localization, to find the position and orientation of the prop from two-dimensional pixel data. Criteria are proposed for the selection of colors of stripes on the props which maximize separation in the two-dimensional chrominance color space, so that instead of detecting absolute colors, significant color transitions are detected. Thus, the need for calibration of the system dependent on lighting conditions which tend to affect apparent colors can be avoided.

SUMMARY OF THE INVENTION

In spite of the above knowledge and techniques, successful object tracking is still difficult to accomplish. A particularly difficult challenge is to extract only the pixels of a video image which correspond to an object of interest. For example, although tracking an object having one color against a solid background of a different color can be done with relative ease, tracking objects is not regarded easy in cases of multi-colored and changing backgrounds. Clearly, a robust tracking system cannot assume anything about the background of the scene.

Accordingly, embodiments of the present invention address the need in the art for a system that can track objects through a single camera in changing environment and lighting conditions.

According to a first aspect of the invention, there is provided a system for tracking a controlling object comprising: a camera operatively coupled to a processor, the camera configured to obtain a colored light and transfer the respective data to the processor; the processor is configured to receive said data from the camera and to track an object in accordance with certain color; a controlling object serving as an object to be tracked by the processor and configured to emit the light with certain color, wherein said certain color is selected among at least two alternative colors.

According to another aspect of the invention there is provided a method for tracking a controlling object, said method comprising: receiving a colored light in order to facilitate tracking an object; configuring the controlling object to emit a light with certain color, wherein said certain color is selected among at least two alternative colors; tracking the controlling object, serving as an object to be tracked, in accordance with said selected certain color.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings (Figures, or simply "FIGS."), wherein.

Figure 1:
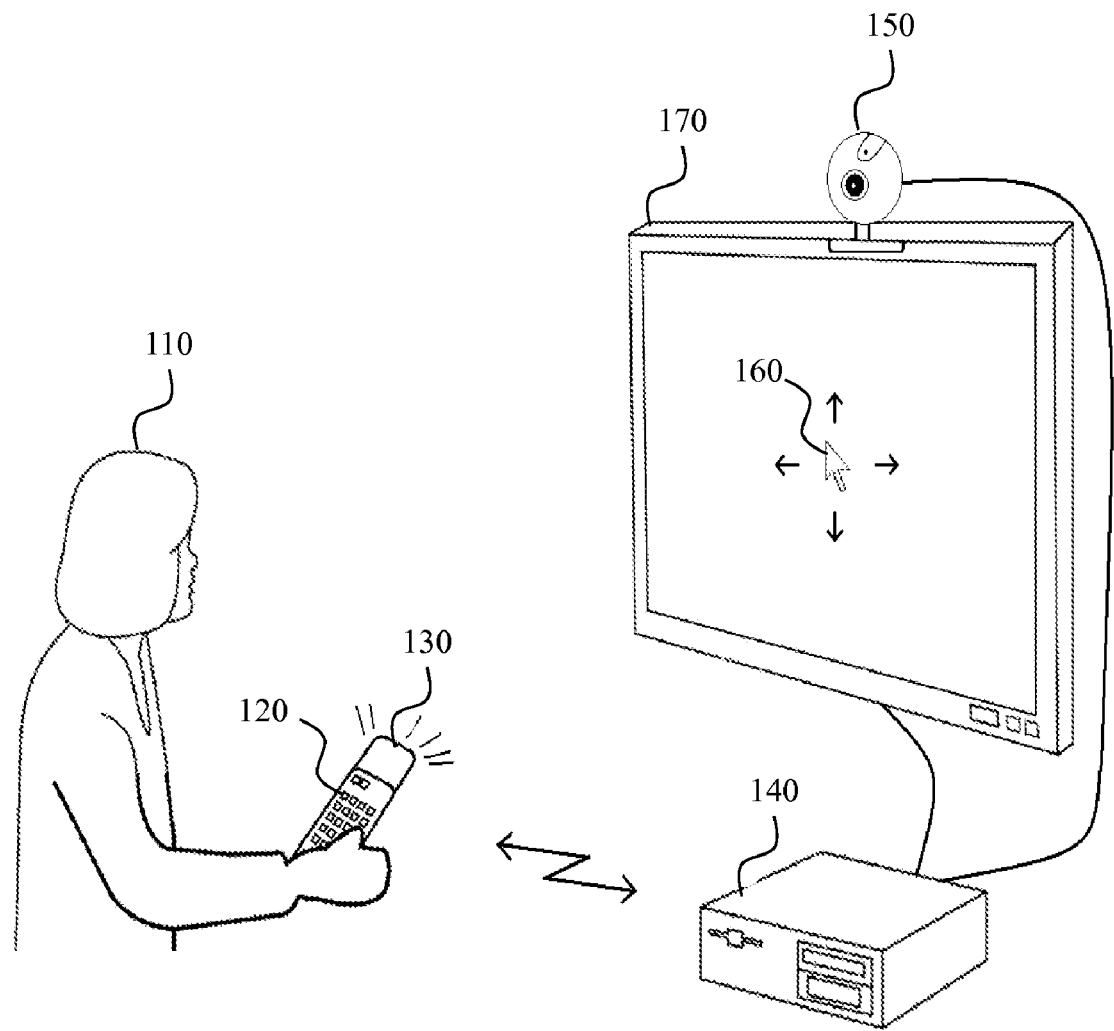
FIG. 1 is a schematic illustration showing the environment in which the system according to some embodiments of the invention operates.

The drawings together with the description make apparent to those skilled in the art how the invention may be embodied in practice.

Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the disclosure. However, it will be understood by those skilled in the art that the teachings of the present disclosure may be practiced without these specific details. In other instances, well-known methods, procedures, components and circuits have not been described in detail so as not to obscure the teachings of the present disclosure.

FIG. 1 shows a schematic illustration of a typical environment in which the system operates. A user 110 is holding a controlling object 120, embodied as a remote control (or simply, a controller or a controlling object). The remote control is provided with a light emitting area 130 (such as light emitting diodes). The light is picked up by a camera 150. Camera 150 is connected to a computer 140 that analyzes the incoming video frames and tracks light emitting area 130. By moving the remote control, the user can control the on-screen cursor 160, on a screen 170.

According to some embodiments of the invention, the controlling object is a mobile phone having dedicated software installed thereon. The color light emitter is then implemented by the mobile phone liquid crystal display (LCD).

Figure 2:
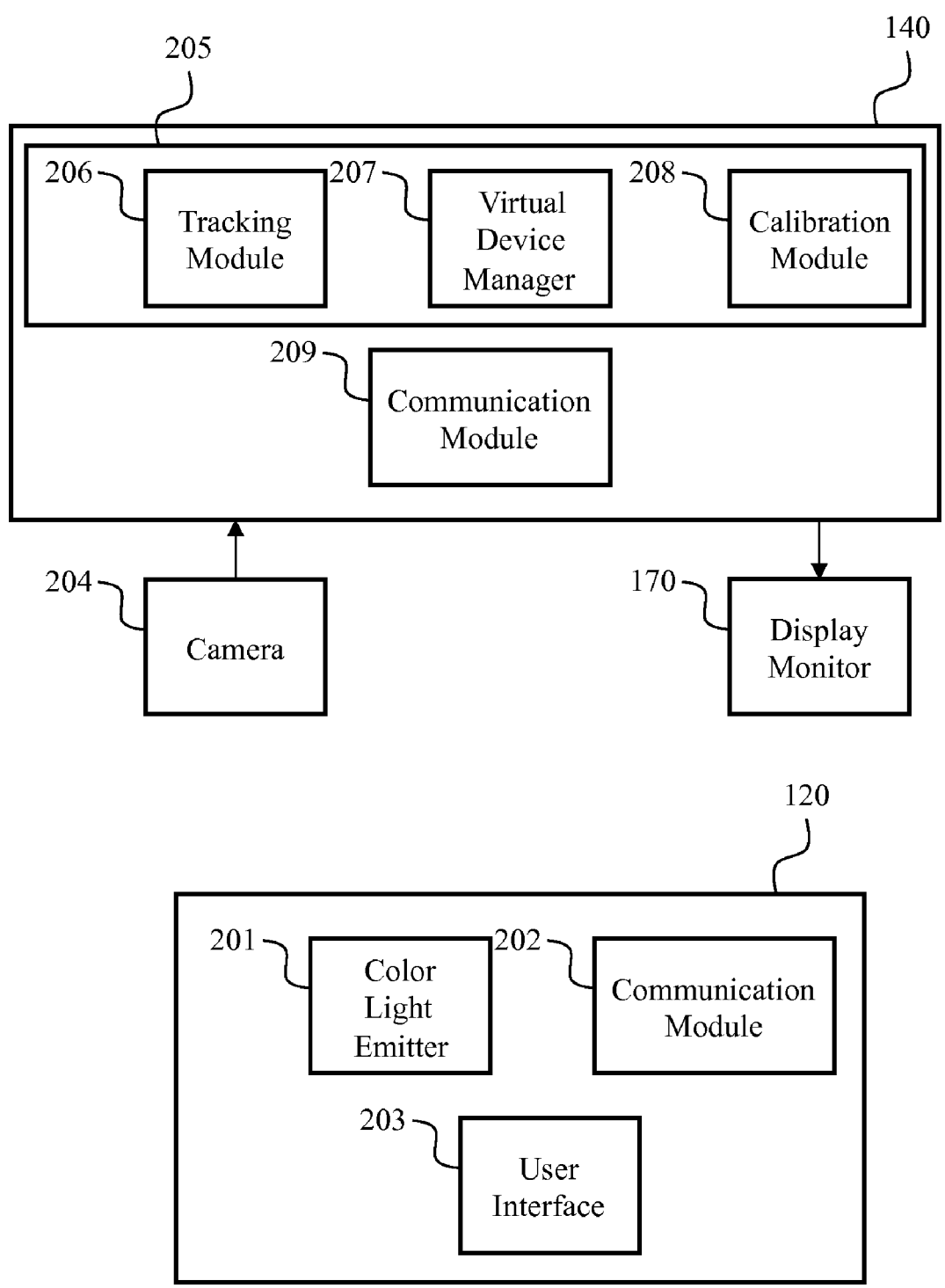
FIG. 2 shows a general system architecture, in accordance with some embodiments of the invention.

FIG. 2 shows a schematic block diagram showing the architecture of general system architecture, in accordance with an embodiment of the invention. FIG. 2 is a detailed schematic hardware description of a remote control device, its subsystems, and a controlled computer system.

The remote control (controlling object) 120 shown in FIG. 2 is used for controlling the computer. It should be noted that other controlling objects such as game-pads, guns, wheels and the like may be used in the place of the remote control 120.

As shown in FIG. 2, according to certain embodiments, the remote control comprises of user interface 203 such as control buttons, a communications module 202 and a designated color light emitter 201. The communications module 202 can be based on any known technology, such as Infra-red signals, RF signals, new Bluetooth communication protocol and the like.

According to certain embodiments, the communications module may be bi-directional, so that it can send and receive commands from the computer system 140. According to certain embodiments, the color light emitter 201 may contain LED lights of different colors, preferably red, green and blue, and can light them with different intensities (varying currents) to create colorful combinations spanning the full spectrum of visible light.

In a preferred embodiment, the color of the light emitter can be initiated and configured via a command issued at the computer system 140. The computer system 140 comprises a processor 205 that runs the software, a camera 204 associated with the processor 205 which can be any simple or high-end camera that is arranged to have a line of sight with the user-manipulated controlling object 120, and a communication module 209 that is able to communicate with the controller's communications module 202.

In certain embodiments, the computer system has a display monitor 170 connected to it as well. According to certain embodiments, a Tracking module 206 is responsible of extracting the pixels corresponding to the color light emitter 201 from the images acquired by the camera 204, and establishing its location in respect to the scene captured by the camera. According to certain embodiments, a calibration module 208 is responsible for selecting the best color to track within a given scene, as will be discussed later.

According to certain embodiments, a Virtual Device Manager 207 is responsible for obtaining the tracking information from the Tracking module 206 and using it in a way that is productive for the user. In some embodiments of this invention, the tracking data will be used to move the mouse cursor, emulate joystick controllers; synthesize keyboard events, save the tracking data to files, send it over the network, etc.

According to some embodiments of the invention, in operation, the processor 205 is arranged to initially process the colorimetric data of an image containing the controlling object and determine the least common color in the image. Thus, the processor selects the most distinguishable color in the image, and transmits it to the controller which is arranged to light the color light emitter in that color. From that point onwards, a constant update process takes place and at each sampling time, the most distinguishable color is transmitted from the processor to the controlling object.

Alternatively, the processor may present the user with the distinguishable color on the display in a visually indicative manner, such as color, number, shape and the like. The user is then encouraged to input the presented indicator on the controller such that the light emitter emits the selected color.

Figure 3:
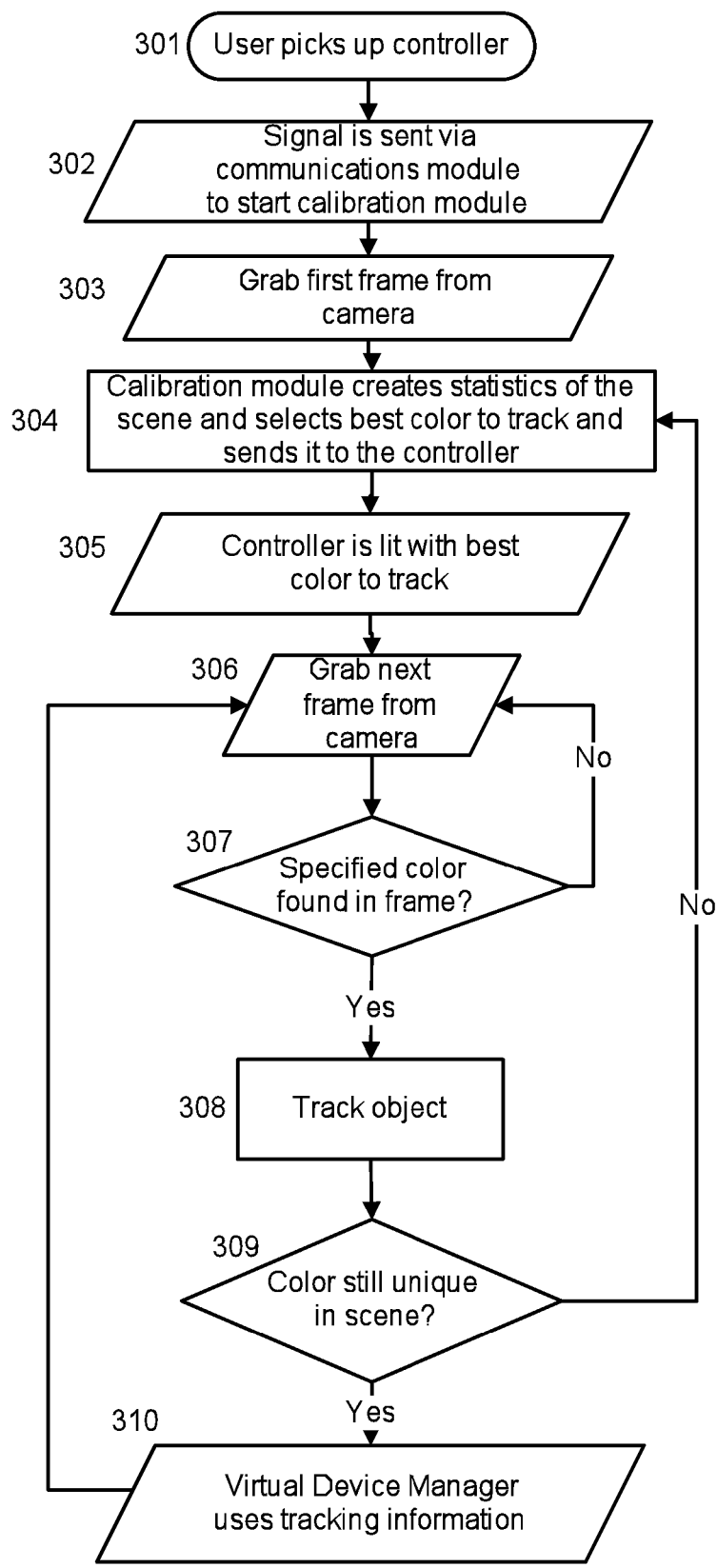
FIG. 3 shows a flowchart showing the main operations of the system, in accordance with an embodiment of the invention.

FIG. 3 illustrates a general flowchart showing the main operations of the system, in accordance with an embodiment of the invention. The flowchart describes the actions of the software upon the user request to start tracking the controller. When the user wishes to start using the remote controller (301), she sends an indication to the computer through the communications module (302). Then, the Calibration module gets the first frame of data from the camera (303), creates statistics about the color distribution in the scene, and selects the optimal color for tracking in these conditions (304). In general, the optimal color will be a color that is most uncommon in the current scene, so it can be easily tracked and is not confused with objects in the background. Next, the color information is sent to the remote controller through the communications module (305), and the designated color light emitter is lit in the selected color. According to certain embodiment, at this stage the tracking module continuously receives the captured frames from the camera and searches for the selected color in each frame (Steps 306 and 307). This continues until the specified color is found in the scene, which means that the camera "sees" the color light emitter. After the selected color was found, the tracking module calculates the position, dimension and angle of tracked area (308). The tracking module now checks if the pixels in the frame that correspond to the tracked color form one continuous area ("blob") or more (309). If only one "blob" is found, this means that the pixels correspond to the color light emitter, and that the tracking is successful. In that case, the tracking data continues to step 310 where it is used by the Virtual Device Manager as some input. If two or more "blobs" are found, it means that successful tracking will be difficult to accomplish with the current color, probably because the background has changed, and other objects appear to be in the same color. In this case, the system goes back to step 304, to select a new color, and continues according to the proper steps from there.

According to some embodiments of the invention there is provided the above mentioned system wherein the processor is configured to automatically select said certain color in accordance with the data received from the camera.

According to some embodiments of the invention there is provided the above mentioned system wherein the (selected) color of the emitted light is a least represented color in the scene, out of said at least two alternative colors.

According to some embodiments of the invention there is provided the above mentioned system wherein said controller is automatically configured by said processor to emit light of the selected color.

According to some embodiments of the invention there is provided the above mentioned method wherein the color of the light emitted by the controller is automatically selected.

According to some embodiments of the invention there is provided the above mentioned method wherein the (selected) color of the emitted light is a least represented color in the scene, out of said at least two alternative colors.

According to some embodiments of the invention there is provided the above mentioned method wherein said controller is automatically configured to emit light of a selected color.

In accordance with a certain embodiments of the present invention a computer tracking system that uses a camera to track various user manipulated controllers is disclosed. According to certain embodiments, the user holds an electronic device that can communicate with the computer via wire or wireless technology. This device has a designated light emitting area on it, so that the computer can "see" and recognize it via the camera. When the user wants to start using the controller, the computer selects the most appropriate and unique color to track in the current scene. It then sends this information to the user-held controller which lights up in that specific color. From this point on the computer can track the location of the controller using some known algorithm such as CAMSHIFT since its color is known and guaranteed to be unique in the current scene in view of the camera. The controller can then be used as an input device, as its movements are tracked by the computer.

When the tracking is in action, the scene that the camera "sees" may change, due to change of lighting conditions, or introduction of new objects in the scene (for example, someone walks in the background of the scene, behind the user). This may cause problems tracking the controller if the color of the object that is tracked is similar to the color of some new object in the scene. In accordance with certain embodiments, the software can detect such situations, and re-evaluate the scene, possibly issuing a new color for the controller, that will be easily differentiated.

Furthermore, in certain embodiments where the communications between the remote controller and the computer system is not bi-directional, and the computer system can not send information to the remote controller, the user may choose to turn on the light-emitting area manually to any desired color which can be tracked by the computer system. According to certain embodiments, the computer system may scan the scene to check which colors are present in the picture, and then ask the user to turn on a light of specific color on the remote controller so that it will be easily differentiated from the background. When the computer system recognizes that this new color is available in the frame, it may start tracking it.

Moreover, in certain embodiments several controllers can be tracked and used at the same time; each assigned with a different color. This can be convenient for multi-user input, games and various tracking applications, some of which will be described later.

In accordance with another aspect of the invention, a "virtual device manager" software component is introduced. This component receives the tracking data of the different controllers in real time, and is responsible of using this data as an input means, allowing convenient man-machine interaction. Without loss of generality, it can let the user set the mechanisms of translation between the controller's motion to emulation of input devices such as movement of the mouse cursor, gaming interfaces such as joysticks, racing wheels, guns etc.

It should be noted that the term controller as disclosed herein refers to a user manipulated electronic device which serves to communicate with a computer. It can take many different shapes, for example: remote controls, mice, wands, steering wheels, joysticks, electronic pens, game pads, wearable devices etc. It should also be noted that term remote control as disclosed herein serves as non limiting example of such a controller and is not restricted to a remote control per se.

According to some embodiments of the invention, the system, method, computer program product can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output.

The tracking system may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

The tracking system may be embodied as a computer implemented method, data processing system, or a computer program product. The invention may be implemented by and utilize processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer, such as the communication device according to the present invention are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the tracked object may be implemented on a communication device with keyboard or any other means for enabling the user to provide input to the computerized system.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Those skilled in the art will envision other possible variations, modifications, and applications that are also within the scope of the invention. Accordingly, the scope of the invention should not be limited by what has thus far been described, but by the appended claims and their legal equivalents.

What is claimed is:

1. A data processing system for tracking a spatially manipulated controlling object, said system comprising:
    a camera;
    a processor operatively coupled to said camera;
    a controlling object designated as an object to be tracked by said processor and arranged to emit light at a specific color such that the specific color is selected from a plurality of alternative colors;
    wherein said camera is arranged to receive said colored light and to further transfer the respective data to the processor,
    wherein said processor is arranged to receive said data from the camera, and
        wherein the selected color of the emitted light is a least represented color in the scene, out of said at least two alternative colors.

2. A data processing system for tracking a spatially manipulated controlling object, said system comprising:
    a camera;
    a processor operatively coupled to said camera;
    a controlling object designated as an object to be tracked by said processor and arranged to emit light at a specific color such that the specific color is selected from a plurality of alternative colors;
    wherein said camera is arranged to receive said colored light and to further transfer the respective data to the processor, wherein said processor is arranged to receive said data from the camera and to track said controlling object in accordance with the selected specific color,
    wherein the processor is configured to automatically select said certain color in accordance with the data received from the camera, and
    wherein the processor is configured to reselect and track light of a new color as a result of a change in color representation in a scene.

3. A method of tracking a controlling object, said method comprising:
    receiving a colored light indicative of the spatial location of the controlling object;
    configuring the controlling object to emit a light with specific color, wherein the specific color is selected from a plurality of alternative colors, and wherein the selection complies with data received by the controlling object and pertaining to the optical characteristics of the background surrounding the controlling object;
    tracking the controlling object, based upon the selected specific color.

4. The method according to claim 3, wherein the color of the light emitted by the controlling object is automatically selected.

5. The method according to claim 3, wherein the color of the light emitted by the controlling object is manually selected by a user.

6. The method according to claim 3, wherein the selected color of the emitted light is a least represented color in the scene, out of said at least two alternative colors.

7. The method according to claim 4, wherein said controlling object is automatically configured to emit light of a selected color.

8. The method according to claim 4, wherein said controlling object is manually configures to emit light of a selected color.

9. The method according to claim 4, wherein the color of the light emitted by the controlling object is reselected in response to the changes in color representation in a scene.

10. The method according to claim 3, wherein the controlling object is configured to provide input commands.

11. The method according to claim 3, wherein a plurality of controlling objects are tracked concurrently, such that each controlling object emits light in a different color.

* * * * *

UNITED STATES PATENT AND TRADEMARK OFFICE
CERTIFICATE OF CORRECTION

PATENT NO.        : 8,094,885 B2                                               Page 1 of 1
APPLICATION NO.   : 12/531181
DATED             : January 10, 2012
INVENTOR(S)       : Yaron Tanne It is certified that error appears in the above-identified patent and that said Letters Patent is hereby corrected as shown below:

Title Page,
please insert --Related U.S. Application Data, (60) Provisional application No. 60/907,353, filed Mar. 27, 2007--

Signed and Sealed this
Sixth Day of March, 2012

David J. Kappos
*Director of the United States Patent and Trademark Office*